US012620122B2

(12) United States Patent
Yao et al.

(10) Patent No.: US 12,620,122 B2
(45) Date of Patent: May 5, 2026

(54) TARGET DETECTION METHOD AND APPARATUS

(71) Applicant: Siemens Aktiengesellschaft, Munich (DE)

(72) Inventors: Wei Yao, Chaoyang (CN); Dong Li, Beijing (CN); Chuan Yu Zhang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/714,211

(22) PCT Filed: Nov. 17, 2022

(86) PCT No.: PCT/CN2022/132660
§ 371 (c)(1),
(2) Date: May 29, 2024

(87) PCT Pub. No.: WO2023/098487
PCT Pub. Date: Jun. 8, 2023

(65) Prior Publication Data
US 2024/0420362 A1     Dec. 19, 2024

(30) Foreign Application Priority Data

Nov. 30, 2021     (EP) ..................................... 21211271

(51) Int. Cl.
*G06K 9/36*          (2006.01)
*G06T 7/70*          (2017.01)
(Continued)

(52) U.S. Cl.
CPC .................. *G06T 7/70* (2017.01); *G06T 7/73* (2017.01); *G06T 7/74* (2017.01); *G06V 10/22* (2022.01);
(Continued)

(58) Field of Classification Search
CPC ........ G06V 10/20; G06V 10/22; G06V 10/24; G06V 10/243; G06V 10/25; G06V 10/255;
(Continued)

(56) References Cited

U.S. PATENT DOCUMENTS

2016/0275686 A1* 9/2016 Zach ....................... G06V 20/64
2019/0057507 A1* 2/2019 El-Khamy ............. G06V 20/70
(Continued)

FOREIGN PATENT DOCUMENTS

CN          109800735 A     5/2019
CN          110008915 A     7/2019
(Continued)

OTHER PUBLICATIONS

Rebecca König and Bertram Drost, "A Hybrid Approach for 6DoF Pose Estimation", Springer, Computer Vision—ECCV 2020 Workshops, Lecture Notes in Computer Science, vol. 12536, Jan. 3, 2021, pp. 700-706 (Year: 2021).*
(Continued)

*Primary Examiner* — Eric Rush
(74) *Attorney, Agent, or Firm* — Slayden Grubert Beard PLLC

(57)          ABSTRACT

Embodiments of this application provide a target detection method and apparatus, an electronic device, and a computer storage medium. The method includes: obtaining a target image including a target object; performing instance segmentation on the target image, to obtain a segmentation mask corresponding to the target object; obtaining, based on the segmentation mask, position relationship features between target pixels in a target region in which the target object is located in the target image; obtaining position relationship features between standard pixels in a preset region of interest in a standard image, where the standard
(Continued)

Obtain a target image representing a target object — 101

Perform instance segmentation on the target image to obtain a segmentation mask corresponding to the target object — 102

Obtain, based on the segmentation mask, position relationship features between target pixels in a target region of the target image — 103

Obtain position relationship features between standard pixels in a preset region of a standard object in a standard image — 104

Match the position relationship features between the target pixels and the standard pixels to obtain a correspondence and obtain pose information of the target object — 105 image includes a standard object corresponding to the target object; and matching the position relationship features between the target pixels and the position relationship features between the standard pixels, to obtain a correspondence between the target pixels and the standard pixels, and obtaining pose information of the target object based on the correspondence.

5 Claims, 6 Drawing Sheets

(51) Int. Cl.

| | |
|---|---|
| *G06T 7/73* | (2017.01) |
| *G06V 10/22* | (2022.01) |
| *G06V 10/26* | (2022.01) |
| *G06V 10/40* | (2022.01) |
| *G06V 10/44* | (2022.01) |
| *G06V 10/70* | (2022.01) |
| *G06V 10/74* | (2022.01) |
| *G06V 10/75* | (2022.01) |
| *G06V 10/77* | (2022.01) |
| *G06V 10/80* | (2022.01) |
| *G06V 10/82* | (2022.01) |

(52) U.S. Cl.
CPC .............. *G06V 10/26* (2022.01); *G06V 10/40* (2022.01); *G06V 10/454* (2022.01); *G06V 10/70* (2022.01); *G06V 10/74* (2022.01); *G06V 10/75* (2022.01); *G06V 10/751* (2022.01); *G06V 10/757* (2022.01); *G06V 10/7715* (2022.01); *G06V 10/80* (2022.01); *G06V 10/806* (2022.01); *G06V 10/82* (2022.01); *G06T 2207/20016* (2013.01); *G06T 2207/20084* (2013.01); *G06V 2201/07* (2022.01)

(58) Field of Classification Search
CPC ........ G06V 10/26; G06V 10/40; G06V 10/44; G06V 10/454; G06V 10/70; G06V 10/74; G06V 10/75; G06V 10/751; G06V 10/757; G06V 10/764; G06V 10/77; G06V 10/7715; G06V 10/80; G06V 10/803; G06V 10/806; G06V 10/82; G06V 2201/03; G06V 2201/05; G06V 2201/06; G06V 2201/07; G06V 2201/12; G06T 7/0002; G06T 7/0004; G06T 7/0012; G06T 7/10; G06T 7/11; G06T 7/143; G06T 7/174; G06T 7/70; G06T 7/73; G06T 7/74; G06T 7/75; G06T 2207/20016; G06T 2207/20084; G06N 3/02; G06N 3/04; G06N 3/045; G06N 3/0464

USPC ........ 382/100, 103, 113, 115, 117, 118, 128, 382/133, 141–144, 152–159, 173, 181, 382/190, 195, 203, 209, 216–218, 382/224–227, 282, 283, 291
See application file for complete search history.

(56) References Cited

U.S. PATENT DOCUMENTS

| | | | |
|---|---|---|---|
| 2019/0311202 A1 | 10/2019 | Lee et al. | |
| 2020/0134365 A1* | 4/2020 | Liu | G06V 10/806 |
| 2021/0035305 A1* | 2/2021 | Fang | G06V 10/25 |
| 2022/0180548 A1* | 6/2022 | Li | G06T 7/73 |
| 2023/0102467 A1* | 3/2023 | He | G06V 10/764 |
| | | | 382/103 |
| 2023/0169755 A1* | 6/2023 | He | G06T 7/73 |
| | | | 382/190 |

FOREIGN PATENT DOCUMENTS

| | | |
|---|---|---|
| CN | 110599489 A | 12/2019 |
| WO | 2021004402 A1 | 1/2021 |

OTHER PUBLICATIONS

Bertam Drost, Markus Ulrich, Nassir Navab and Slobodan Ilic, "Model Globally, Match Locally: Efficient and Robust 3D Object Recognition," 2010 IEEE Computer Society Conference on Computer Vision and Pattern Recognition, 2010, pp. 998-1005 (Year: 2010).*
Search Report for International Application No. PCT/CN2022/132660, 11 pages, Feb. 7, 2023.
Search Report for EP Application No. 21211271.8, 7 pages, May 20, 2022.
König, Rebecca et al: "A Hybrid Approach for 6DoF Pose Estimation"; Glasgow, UK, Aug. 23-28, 2020 Proceedings, Part II; Pattern Recognition: 5th Asian Conference, ACPR 2019, Auckland, New Zealand, Nov. 26-29, 2019, Revised Selected Papers, Part II; Springer Intrtnational Publishing, Cham; Jan. 3, 20021 (Jan. 3, 2021), XP055920016.
Drost, Bertram et al: "Model Globally, Match Locally: Efficient and Robust 3D Object Recognition"; 2010 IEEE Conference on Computer Vision and Pattern Recognition (CVPR), Jun. 13-18, 2010, San Francisco, CA, USA; Jun. 1, 2010 (Jun. 1, 2010), pp. 998-1005, XP055415021; 2010.
Tsung-Yi, Lin et al: "Feature Pyramid Networks for Object Detection"; 2017 IEEE Conference on Computer Vision and Pattern Recognition (CVPR), IEEE Computer Society, US; Jul. 21, 2017 (Jul. 21, 2017), pp. 936-944, XP033249432.
He, Kaiming et al., "Mask R-CNN," Proceedings of the IEEE International Conference on Computer Vision, 12 Pages, Jan. 24, 2018.
Korean Office Action, Application No. 20247021549, 12 pages, Nov. 19, 2024.

\* cited by examiner

Obtain a target image representing a target object

101

Perform instance segmentation on the target image to obtain a segmentation mask corresponding to the target object

102

Obtain, based on the segmentation mask, position relationship features between target pixels in a target region of the target image

103

Obtain position relationship features between standard pixels in a preset region of a standard object in a standard image

104

Match the position relationship features between the target pixels and the standard pixels to obtain a correspondence and obtain pose information of the target object

105

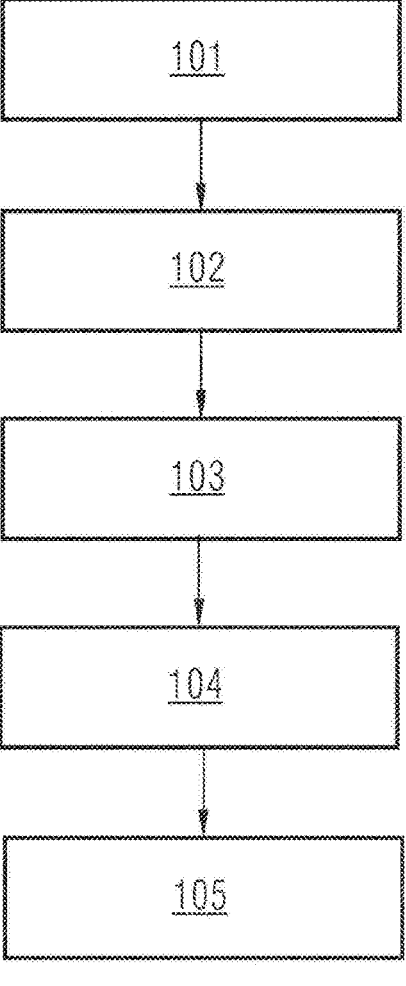

TARGET DETECTION METHOD AND APPARATUS

CROSS-REFERENCE TO RELATED APPLICATIONS

This application is a U.S. National Stage Application of International Application No. PCT/CN2022/132660 filed Nov. 17, 2022, which designates the United States of America, and claims priority to EP Application No. 21211271.8 filed Nov. 30, 2021, the contents of which are hereby incorporated by reference in their entirety.

TECHNICAL FIELD

This disclosure generally relates to image processing technologies. Various embodiments of the teachings herein include target detection methods and/or apparatus.

BACKGROUND

Target detection technologies can be applied to various scenarios as the technologies mature. For example, in the fields of industrial production and the like, through the target detection technologies, workpieces can be automatically picked and assembled by using intelligent robots. Specifically, an image including a workpiece may be first obtained, and then target detection is performed on the image, to obtain pose information (position information and posture information) of the target workpiece, so that the intelligent robot obtains the target workpiece according to the pose information and assembles the target workpiece.

An existing target detection method has relatively low detection efficiency during use. Therefore, how to improve target detection efficiency is an urgent problem to be resolved.

SUMMARY

Teachings of the present disclosure may be used for resolving the technical problem, including target detection methods and apparatus to resolve a defect of relatively low detection efficiency in the related art. For example, some embodiments include a target detection method, including: obtaining a target image including a target object; performing instance segmentation on the target image, to obtain a segmentation mask corresponding to the target object; obtaining, based on the segmentation mask, position relationship features between target pixels in a target region in which the target object is located in the target image; obtaining position relationship features between standard pixels in a preset region of interest of a target object in a standard image; and matching the position relationship features between the target pixels and the position relationship features between the standard pixels, to obtain a correspondence between the target pixels and the standard pixels, and obtaining pose information of the target object based on the correspondence.

In some embodiments, obtaining, based on the segmentation mask, position relationship features between target pixels in a target region in which the target object is located in the target image includes: combining, based on the segmentation mask, the target pixels in the target region in which the target object is located in the target image in pairs, to obtain a plurality of target pixel pairs, and obtaining, for each target pixel pair, a position relationship feature between two target pixels in the target pixel pair; and obtaining position relationship features between standard pixels in a preset region of interest in a standard image includes: obtaining the standard image and the preset region of interest of a target object in the standard image; and combining the standard pixels in the preset region of interest in pairs, to obtain a plurality of standard pixel pairs, and obtaining, for each standard pixel pair, a position relationship feature between two standard pixels in the standard pixel pair.

In some embodiments, for each target pixel pair, the position relationship feature between the two target pixels in the target pixel pair is obtained based on a distance between the two target pixels, an angle between normal vectors corresponding to the two target pixels respectively, and angles between the normal vectors corresponding to the two target pixels and a connection line between the two target pixels; and for each standard pixel pair, the position relationship feature between the two standard pixels in the standard pixel pair is obtained based on a distance between the two standard pixels, an angle between normal vectors corresponding to the two standard pixels respectively, and angles between the normal vectors corresponding to the two standard pixels and a connection line between the two standard pixels.

In some embodiments, performing instance segmentation on the target image, to obtain a segmentation mask corresponding to the target object includes: inputting the target image into a pre-trained instance segmentation model, and performing instance segmentation on the target image by using the instance segmentation model, to obtain the segmentation mask corresponding to the target object.

In some embodiments, the instance segmentation model includes: a feature extraction network, a feature fusion network, a region generation network, a feature alignment layer, a classification and regression network, and a segmentation mask network; and inputting the target image into a pre-trained instance segmentation model, and performing instance segmentation on the target image by using the instance segmentation model, to obtain the segmentation mask corresponding to the target object includes: inputting the target image into the feature extraction network in the pre-trained instance segmentation model, and performing multi-scale feature extraction on the target image by using the feature extraction network, to obtain a plurality of levels of initial feature maps corresponding to the target image; performing feature fusion on the plurality of levels of initial feature maps by using the feature fusion network, to obtain fused feature maps; obtaining information about an initial region of the target object based on the fused feature map and by using the region generation network; performing feature extraction on the initial feature maps based on the information about the initial region and by using the feature alignment layer, to obtain a region feature map corresponding to the initial region and in the initial feature maps; obtaining category information and position information of the target object based on the region feature map and by using the classification and regression network; and obtaining the segmentation mask corresponding to the target object based on the region feature map and by using the segmentation mask network.

In some embodiments, performing feature fusion on the plurality of levels of initial feature maps by using the feature fusion network, to obtain fused feature maps includes: performing a convolution operation on each of the initial feature maps by using the feature fusion network, to obtain a plurality of levels of initial dimension-reduced feature maps; sequentially performing fusion processing on every two adjacent levels of initial dimension-reduced feature maps according to a descending order of levels, to obtain an initially fused feature map, and updating an initial dimension-reduced feature map at a lower level in the adjacent levels by using the initially fused feature map, where a size of an initial dimension-reduced feature map at an upper level is less than a size of the initial dimension-reduced feature map at the lower level; performing the convolution operation on each of the initially fused feature maps, to obtain a plurality of levels of dimension-reduced feature maps; and sequentially performing fusion processing on every two adjacent levels of dimension-reduced feature maps according to an ascending order of levels, to obtain a transition feature map, performing fusion processing on the transition feature map and the initial feature map, to obtain a fused feature map, and updating a dimension-reduced feature map at an upper level in the adjacent levels by using the fused feature map, where a size of the dimension-reduced feature map at the upper level is less than a size of a dimension-reduced feature map at a lower level.

In some embodiments, the feature extraction network includes two concatenated convolution layers, a size of a convolution kernel of the former convolution layer is 1*1, and a convolution stride of the former convolution layer is 1; and a convolution stride of the latter convolution layer is less than or equal to a size of a convolution kernel of the latter convolution layer.

As another example, some embodiments include a target detection apparatus, including: a target image obtaining module, configured to obtain a target image including a target object; a segmentation mask obtaining module, configured to perform instance segmentation on the target image, to obtain a segmentation mask corresponding to the target object; a first position relationship feature obtaining module, configured to obtain, based on the segmentation mask, position relationship features between target pixels in a target region in which the target object is located in the target image; a second position relationship feature obtaining module, configured to obtain position relationship features between standard pixels in a preset region of interest in a standard image, where the standard image includes a standard object corresponding to the target object; and a pose information obtaining module, configured to match the position relationship features between the target pixels and the position relationship features between the standard pixels, to obtain a correspondence between the target pixels and the standard pixels, and obtain pose information of the target object based on the correspondence.

As another example, some embodiments include an electronic device, including a processor, a memory, a communication interface, and a communication bus, where the processor, the memory, and the communication interface complete mutual communication by using the communication bus; and the memory is configured to store at least one executable instruction, and the executable instruction causes the processor to perform one or more of the target detection methods described herein.

As another example, some embodiments include a computer storage medium, storing a computer program, where the computer program, when being executed by a processor, implements one or more of the target detection methods described herein.

BRIEF DESCRIPTION OF THE DRAWINGS

The following describes some specific examples of embodiments of this application in an exemplary rather than restrictive manner with reference to the accompanying drawings. Same reference numerals in the drawings indicate same or similar components or parts. A person skilled in the art should understand that the accompanying drawings are not necessarily drawn to scale. In the accompanying drawings:

FIG. 1 is a schematic flowchart of an example target detection method incorporating teachings of the present disclosure;

LIST OF REFERENCE NUMERALS

Figure 2:
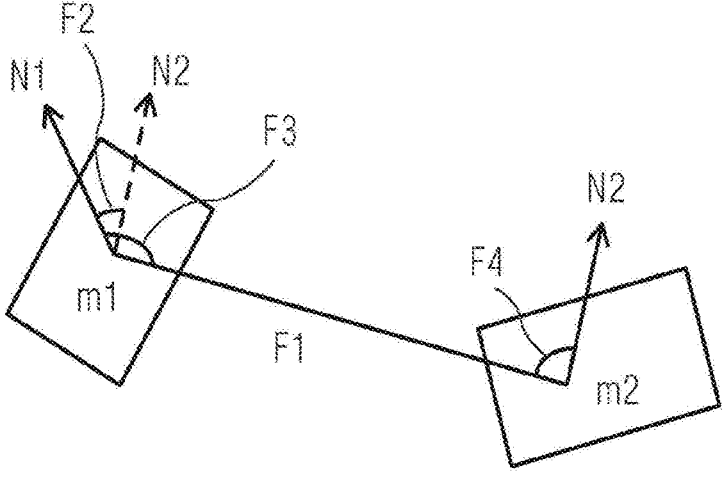
FIG. 2 is a schematic diagram of a position relationship feature incorporating teachings of the present disclosure.

101: obtaining target image including a target object;

102: performing instance segmentation on the target image, to obtain a segmentation mask corresponding to the target object;

103: obtaining, based on the segmentation mask, position relationship features between target pixels in a target region in which the target object is located in the target image;

104: obtaining position relationship features between standard pixels in a preset region of interest in a standard image, where the standard image includes a standard object corresponding to the target object; and 105: matching the position relationship features between the target pixels and the position relationship features between the standard pixels, to obtain a correspondence between the target pixels and the standard pixels, and obtaining pose information of the target object based on the correspondence;

m1 and m2: target pixels;

N1: normal vector corresponding to a target pixel m1;

N2: normal vector corresponding to a target pixel m2;

F: position relationship feature between the target pixels m1 and m2;

F1: distance between two target pixels;

F2: angle between normal vectors corresponding to the two target pixels respectively;

F3 and F4: angles between the normal vectors corresponding to the two target pixels and a connection line between the two target pixels;

H1: convolution kernel of the former convolution layer in a feature extraction network;

H2: convolution kernel of the latter convolution layer in the feature extraction network;

60: target detection apparatus;

601: target image obtaining module;

602: segmentation mask obtaining module;

603: first position relationship feature obtaining module;

604: second position relationship feature obtaining module; and

605: pose information obtaining module.

DETAILED DESCRIPTION

Various embodiments of this application include target detection methods and apparatus, electronic devices, and computer storage media. After position relationship features between target pixels in a target region in a target image are obtained, the position relationship features match position relationship features between standard pixels in a preset region of interest of a target object in a standard image, and pose information of the target object can be obtained based on a correspondence between the target pixels and the standard pixels obtained through matching. Because the preset region of interest is only a part of region of the entire target object, an amount of data of the position relationship features between the standard pixels in the preset region of interest is relatively small compared with position relationship features between all pixels of the target object in the entire standard image, so that when the position relationship features between the target pixels match the position relationship features between the standard pixels, an amount of data of to-be-matched features is also relative small. Therefore, matching speed is faster, thereby improving efficiency of the entire target detection.

In order to enable a person skilled in the art to better understand the technical solutions taught by this application, the following describes the technical solutions of the embodiments of this application with reference to the accompanying drawings in the embodiments of this application. Apparently, the described embodiments are merely some embodiments rather than all of the embodiments of these teachings. All other embodiments obtained by a person skilled in the art shall fall within the protection scope of this disclosure.

It should be noted that, the terms of first and second in this application are only for distinguishing names, and do not represent a sequence relationship, and cannot be understood as indicating or implying relative importance or implicitly specifying the number of the indicated technical features. For example, a first user, a second user, and a third user are only for distinguishing different users.

The following further describes a specific implementation of the embodiments of this application with reference to the accompanying drawings of example embodiments of this application.

FIG. 1 is a schematic flowchart of an example target detection method incorporating teachings of the present disclosure. As shown in FIG. 1, the method includes the following:

Step 101. Obtain a target image including a target object. For example, in a scenario in which an intelligent robot picks a task, an image including a target workpiece may be obtained as a target image. A specific manner of obtaining the target image is not limited.

Step 102. Perform instance segmentation on the target image, to obtain a segmentation mask corresponding to the target object.

Step 103. Obtain, based on the segmentation mask, position relationship features between target pixels in a target region in which the target object is located in the target image. The position relationship features between the target pixels in the target region may be features representing relative position relationships between pixels in the target region. The position relationship features may be obtained based on coordinates of the pixels in the target region.

Step 104. Obtain position relationship features between standard pixels in a preset region of interest of a target object in a standard image. The standard image is an image obtained for a target object at a standard position and having a standard posture. Both the standard position and the standard posture may be preset according to an actual requirement. The scenario in which the intelligent robot picks the task is still used as an example. It is assumed that the target object is a to-be-assembled rectangular workpiece, the standard position may be a preset position convenient for the robot to assemble the workpiece, for example, a preset position on an assembly table; and the standard posture may be a preset posture convenient for the robot to assemble the workpiece, for example, a long side of the workpiece is parallel to an edge of the assembly table. Correspondingly, the standard image may be an image obtained for a target object of which a long side is parallel to the edge of the assembly table and at a preset position of the assembly table.

The preset region of interest may be a region that can represent a specific attribute of the target object, or the preset region of interest may be a specific region that distinguishes the target object from another non-target object. For example, when the target object is a workpiece, the preset region of interest may be a specific texture region, a specific structure region, a specific text region, or the like that distinguishes the workpiece from another workpiece. In an actual application, the preset region of interest may be set and adjusted dynamically according to different actual scenarios. A setting manner of the preset region of interest is not limited.

Corresponding to the position relationship features between the target pixels in the target region, the position relationship features between the standard pixels may be features representing relative position relationships between pixels in preset regions of interest. The position relationship features may also be obtained based on coordinates of the pixels in the preset regions of interest.

Step 105. Match the position relationship features between the target pixels and the position relationship features between the standard pixels, to obtain a correspondence between the target pixels and the standard pixels, and obtain pose information of the target object based on the correspondence. The pose information of the target object includes position information and posture information of the target object.

In some embodiments, after a correspondence between the target pixels and the standard pixels is obtained, initial pose information of the target object in the target image may be first obtained based on the correspondence. In some embodiments, the initial pose information may include initial position information (an initial target region) of the target object in the target image and initial posture information (initial angle information) of the target object in the target image relative to the target object in the standard image. In some embodiments, the initial target region is rotated by the initial posture angle, to obtain a rotated initial target region; and the initial target region and the initial rotation angle are iteratively adjusted based on the correspondence between the target pixels and the standard pixels, to obtain more accurate position information and posture information of the target object as the pose information of the target object in the target image.

After position relationship features between target pixels in a target region in a target image are obtained, the position relationship features match position relationship features between standard pixels in a preset region of interest of a target object in a standard image, and pose information of the target object can be obtained based on a correspondence between the target pixels and the standard pixels obtained through matching. Because the preset region of interest is only a part of region of the entire target object, an amount of data of the position relationship features between the standard pixels in the preset region of interest is relatively small compared with position relationship features between all pixels of the target object in the entire standard image, so that when the position relationship features between the target pixels match the position relationship features between the standard pixels, an amount of data of to-be-matched features is also relative small. Therefore, the matching speed is faster, thereby improving efficiency of the entire target detection.

In some embodiments, step 103 may be implemented as the following: combining, based on the segmentation mask, the target pixels in the target region in which the target object is located in the target image in pairs, to obtain a plurality of target pixel pairs, and obtaining, for each target pixel pair, a position relationship feature between two target pixels in the target pixel pair.

Step 104 may be implemented as the following: obtaining the standard image and the preset region of interest of the target object in the standard image; and combining the standard pixels in the preset region of interest in the standard image in pairs, to obtain a plurality of standard pixel pairs, and obtaining, for each standard pixel pair, a position relationship feature between two standard pixels in the standard pixel pair.

In some embodiments, the position relationship feature between the two target pixels may be a feature representing a relative position relationship between the two target pixels; and correspondingly, the position relationship feature between the two standard pixels may also be a feature representing a relative position relationship between the two standard pixels.

In some embodiments, for each target pixel pair, the position relationship feature between the two target pixels in the target pixel pair is obtained based on a distance between the two target pixels, an angle between normal vectors corresponding to the two target pixels respectively, and angles between the normal vectors corresponding to the two target pixels and a connection line between the two target pixels; and for each standard pixel pair, the position relationship feature between the two standard pixels in the standard pixel pair is obtained based on a distance between the two standard pixels, an angle between normal vectors corresponding to the two standard pixels respectively, and angles between the normal vectors corresponding to the two standard pixels and a connection line between the two standard pixels.

In some embodiments, for each target pixel pair, a four-dimension vector (F1, F2, F3, and F4) may be constructed by using a distance F1 between the two target pixels, an angle F2 between normal vectors corresponding to the two target pixels respectively, and angles (F3 and F4) between the normal vectors corresponding to the two target pixels and a connection line between the two target pixels and may be used as a position relationship feature between the two target pixels in the target pixel pair.

FIG. 2 is a schematic diagram of a position relationship feature according to an embodiment of this application. In FIG. 2, the target pixels are respectively m1 and m2, and F1 is a distance between m1 and m2. N1 is a normal vector corresponding to m1, N2 is a normal vector corresponding to m2, and F2 is an angle (which may be represented by a radian) between N1 and N2. F3 is an angle (which may be represented by a radian) between N1 and F1. F4 is an angle (which may be represented by a radian) between N2 and F1. Correspondingly, a position relationship feature F between the target pixels m1 and m2 is (F1, F2, F3, and F4).

Correspondingly, a position relationship feature between two standard pixels in each standard pixel pair may also be constructed in the manner. Details are not described herein again.

A position relationship feature between two pixels in a pixel pair may be obtained based on a distance between the two pixels, an angle between normal vectors corresponding to the two pixels respectively, and angles between the normal vectors corresponding to the two pixels and a connection line between the two pixels, i.e., in this embodiment of this application, a position relationship feature between two pixels is represented by four different dimensions jointly. Therefore, the obtained position relationship feature can represent a relative position relationship between the two pixels more accurately, and the target pixels match the standard pixels based on the position relationship feature, to obtain a more accurate correspondence between the target pixels and the standard pixels, thereby improving the accuracy of the target detection.

In some embodiments, step 102 may be implemented as the following: inputting the target image into a pre-trained instance segmentation model, and performing instance segmentation on the target image by using the instance segmentation model, to obtain the segmentation mask corresponding to the target object.

In some embodiments, the instance segmentation model may include a feature extraction network, a feature fusion network, a region generation network, a feature alignment layer, a classification and regression network, and a segmentation mask network; and the inputting the target image into a pre-trained instance segmentation model, and performing instance segmentation on the target image by using the instance segmentation model, to obtain the segmentation mask corresponding to the target object may include: inputting the target image into the feature extraction network in the pre-trained instance segmentation model, and performing multi-scale feature extraction on the target image by using the feature extraction network, to obtain a plurality of levels of initial feature maps corresponding to the target image; performing feature fusion on the plurality of levels of initial feature maps by using the feature fusion network, to obtain fused feature maps; obtaining information about an initial region of the target object based on the fused feature map and by using the region generation network; performing feature extraction on the initial feature maps based on the information about the initial region and by using the feature alignment layer, to obtain a region feature map corresponding to the initial region and in the initial feature maps; obtaining category information and position information of the target object based on the region feature map and by using the classification and regression network; and obtaining the segmentation mask corresponding to the target object based on the region feature map and by using the segmentation mask network.

In some embodiments, the performing feature fusion on the plurality of levels of initial feature maps by using the feature fusion network, to obtain fused feature maps may be implemented as the following: performing a convolution operation on each of the initial feature maps by using the feature fusion network, to obtain a plurality of levels of initial dimension-reduced feature maps; sequentially performing fusion processing on every two adjacent levels of initial dimension-reduced feature maps according to a descending order of levels, to obtain an initially fused feature map, and updating an initial dimension-reduced feature map at a lower level in the adjacent levels by using the initially fused feature map, where a size of an initial dimension-reduced feature map at an upper level is less than a size of the initial dimension-reduced feature map at the lower level; performing the convolution operation on each of the initially fused feature maps, to obtain a plurality of levels of dimension-reduced feature maps; and sequentially performing fusion processing on every two adjacent levels of dimension-reduced feature maps according to an ascending order of levels, to obtain a transition feature map, performing fusion processing on the transition feature map and the initial feature map, to obtain a fused feature map, and updating a dimension-reduced feature map at an upper level in the adjacent levels by using the fused feature map, where a size of the dimension-reduced feature map at the upper level is less than a size of a dimension-reduced feature map at a lower level.

Figure 3:
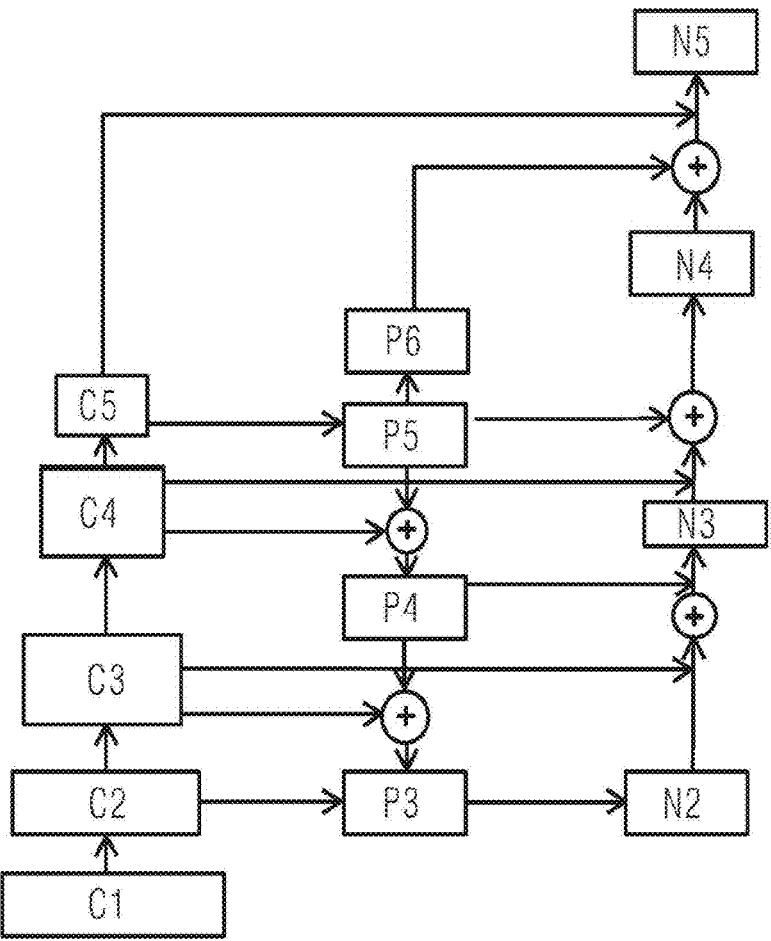
FIG. 3 is a schematic flowchart of a method for obtaining a fused feature map incorporating teachings of the present disclosure.

FIG. 3 is a schematic flowchart of an example method for obtaining a fused feature map incorporating teachings of the present disclosure. C1, C2, C3, C4, and C5 are respectively five levels of initial feature maps corresponding to a target image obtained by using the feature extraction network in the instance segmentation model. A process of performing fusion processing on the five initial feature maps by using the feature fusion network, to obtain fused feature maps is as follows.

Because the C1 level of initial feature map includes relatively small semantic information, feature fusion may be performed based on C2, C3, C4, and C5. Specifically, a convolution operation (a size of a convolution kernel may be 1*1) is performed on C2, C3, C4, and C5 respectively, to obtain a plurality of levels of initial dimension-reduced feature maps, where the convolution operation is performed on C5, to obtain an initial dimension-reduced feature map P5. Subsequently, P5 and an initial dimension-reduced feature map (a feature map obtained after the convolution operation is performed on C4) corresponding to C4 are first fused according to a descending order of levels, to obtain an initially fused feature map P4 (before fusion is performed, upsampling needs to be performed on P5, to obtain a feature map with the same size as the initial dimension-reduced feature map, and then an element corresponding to P5 obtained after the upsampling and an element corresponding to the initial dimension-reduced feature map corresponding to C4 may be added, to obtain the initially fused feature map P4).

In addition, the initial dimension-reduced feature map corresponding to C4 is updated by using P4. P4 and an initial dimension-reduced feature map (a feature map obtained after the convolution operation is performed on C3) corresponding to C3 are then fused, to obtain an initially fused feature map P3 (before fusion is performed, upsampling needs to be performed on P4, to obtain a feature map with the same size as the initial dimension-reduced feature map, and then an element corresponding to P4 obtained after the upsampling and an element corresponding to the initial dimension-reduced feature map corresponding to C3 may be added, to obtain the initially fused feature map P3). In addition, downsampling may be further performed on P5, to obtain P6. So far, the initially fused feature maps P6, P5, P4, and P3 are obtained.

The convolution operation is performed on P6, P5, P4, and P3 respectively, to obtain a plurality of levels of dimension-reduced feature maps, where the convolution operation is performed on P3, to obtain a dimension-reduced feature map N2. Subsequently, N2 and a dimension-reduced feature map corresponding to P4 are first fused according to an ascending order of levels, to obtain a transition feature map, and the transition feature map and C3 are fused, to obtain a fused feature map N3. In addition, the dimension-reduced feature map corresponding to P4 is updated by using N3. N3 and a dimension-reduced feature map corresponding to P5 are fused, to obtain a transition feature map, and the transition feature map and C4 are fused, to obtain a fused feature map N4. In addition, the dimension-reduced feature map corresponding to P5 is updated by using N4. N4 and a dimension-reduced feature map corresponding to P6 are fused, to obtain a transition feature map, and the transition feature map and C5 are fused, to obtain a fused feature map N5. So far, finally fused feature maps N2, N3, N4, and N5 are obtained.

In the process, when two different feature maps are fused, upsampling and enlarging processing may be first performed on a feature map with a relatively small size, so that the two to-be-fused feature maps have the same size, and then, elements at corresponding positions in the feature maps with the same size may be added, to obtain a fused feature map.

In the feature fusion manner, an obtained fused feature map may be obtained after a plurality of levels of fusion processing are performed on initial feature maps. For example, the fused feature map N3 integrates features in P3, P4, and C3 simultaneously; the fused feature map N4 integrates features in P4, P5, and C4 simultaneously; and the fused feature map N5 integrates features in P5, P6, and C5 simultaneously. Therefore, in this embodiment of this application, the obtained fused feature map may include more features, especially more small features, so that the target detection method provided in this embodiment of this application has higher detection accuracy. In addition, the target detection method provided in this embodiment of this application also has better robustness in cases of noise, clutter, and partial occlusion.

In some embodiments, the feature extraction network includes two concatenated convolution layers, a size of a convolution kernel of the former convolution layer is 1*1, and a convolution stride of the former convolution layer is 1; and a convolution stride of the latter convolution layer is less than or equal to a size of a convolution kernel of the latter convolution layer. By using the feature extraction network provided in the embodiment of this application, more and smaller features can be extracted, and the accuracy of the target detection can be improved.

Figure 4:
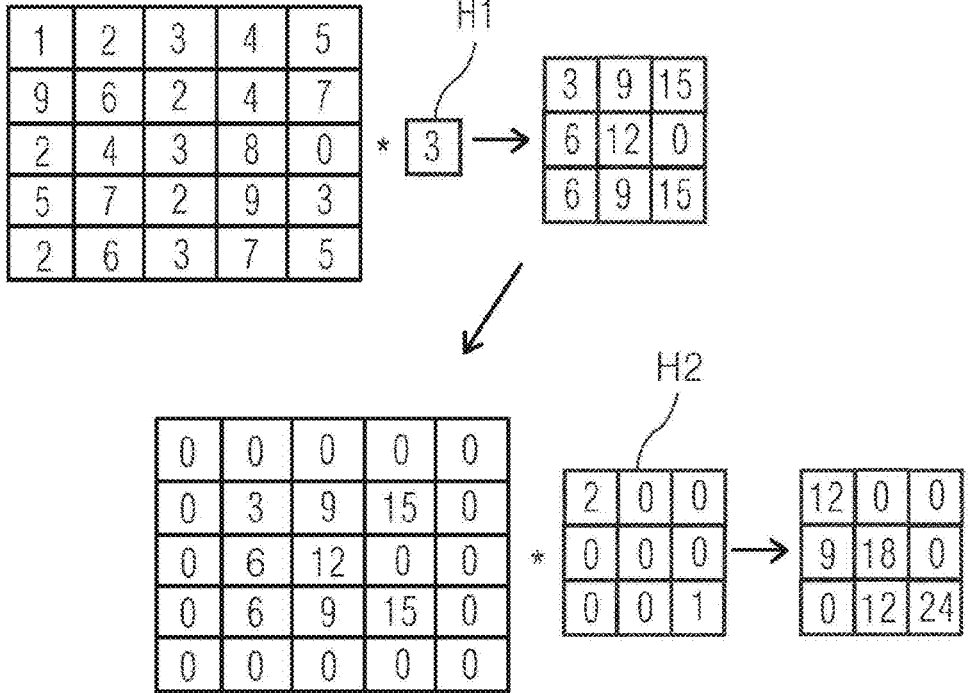
FIG. 4 is a schematic diagram of an example convolution processing process of an existing feature extraction network incorporating teachings of the present disclosure.

The following describes the beneficial effects of the embodiments of this application in detail by using specific examples. FIG. 4 is a schematic diagram of a convolution processing process of an existing feature extraction network and FIG. 5 is a schematic diagram of a convolution processing process of a feature extraction network according to an embodiment of this application.

Referring to FIG. 4, an existing feature extraction network includes two concatenated convolution layers, a size of a convolution kernel H1 of the former convolution layer is 1*1, and a convolution stride of the former convolution layer is 2; and a size of a convolution kernel H2 of the latter convolution layer is 3*3, and a convolution stride of the latter convolution is 1. Feature extraction is performed on an image by using the feature extraction network.

Figure 5:
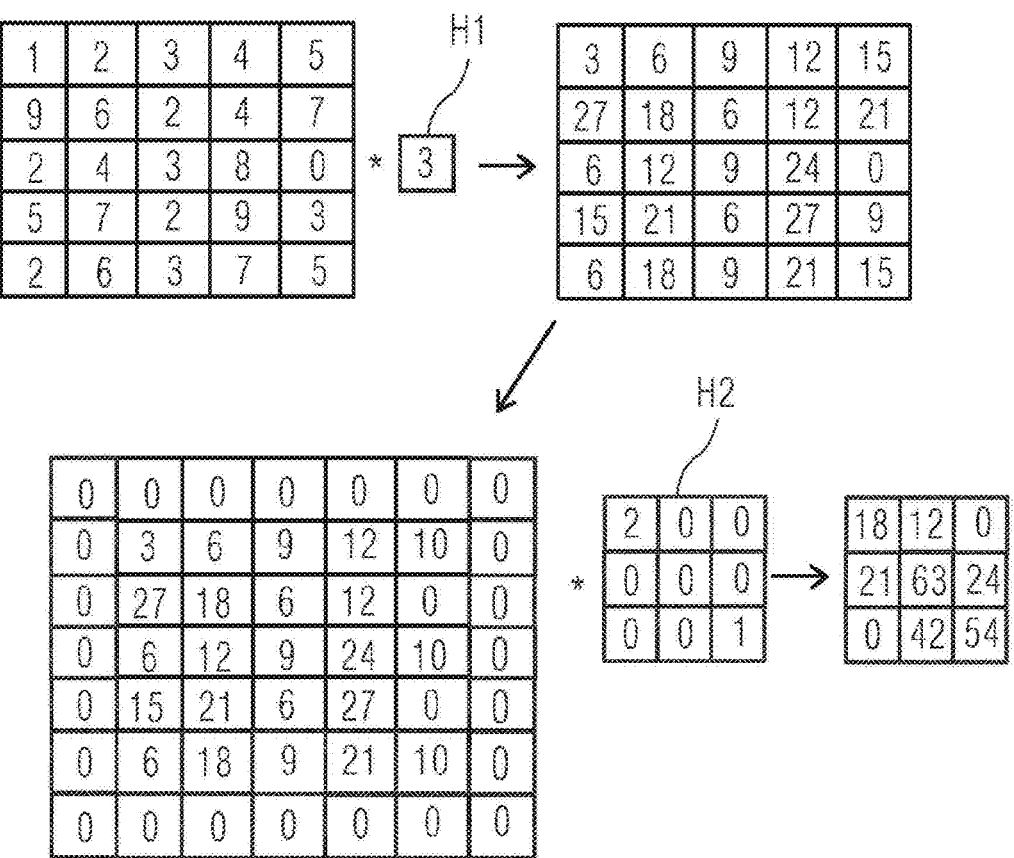
FIG. 5 is a schematic diagram of an example convolution processing process of a feature extraction network incorporating teachings of the present disclosure.

Referring to FIG. 5, a feature extraction network in this embodiment includes two convolution layers connected in series, a convolution kernel of the former convolution layer is also H1, but a convolution stride of the former convolution layer is 1; and a convolution kernel of the latter convolution layer is similarly H2, but a convolution stride of the latter convolution layer is 2. Feature extraction is performed on an image by using the feature extraction network.

It can be learned by comparing FIG. 4 and FIG. 5 that in FIG. 4, when passing through the previous convolution layer, all pixels in a second column, a fourth column, a second row, and a fourth row in the image are skipped during convolution, i.e., the pixels do not participate in a convolution operation. However, in FIG. 5, when passing through the previous convolution layer, all pixels in the image participate in the convolution operation. Therefore, the feature extraction network provided in this embodiment of this application can provide more and smaller features than the existing feature extraction network. Therefore, the accuracy of the target detection can be improved.

Figure 6:
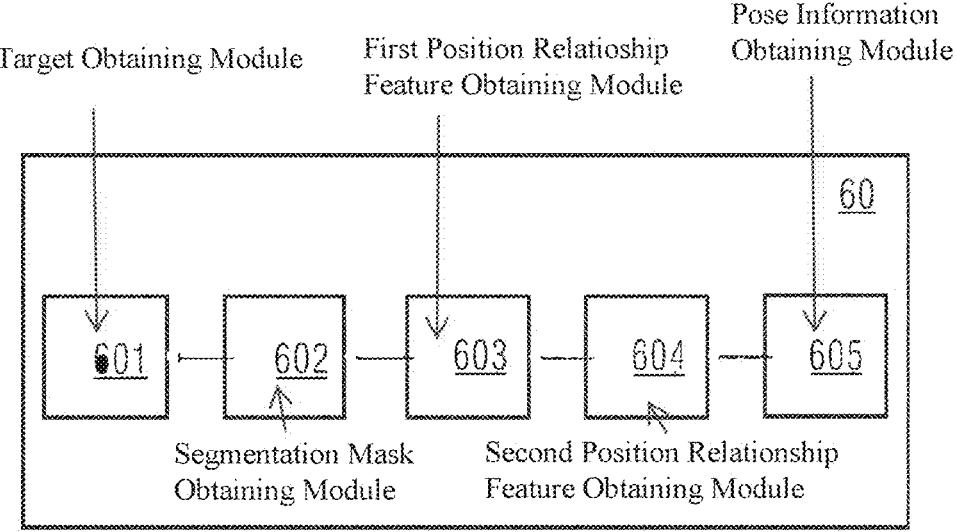
FIG. 6 is a schematic diagram of an example target detection apparatus incorporating teachings of the present disclosure.

Based on the target detection method provided in any of the embodiments, a target detection apparatus is now described. FIG. 6 is a schematic diagram of a target detection apparatus according to an embodiment of this application. A target detection apparatus 60 includes: a target image obtaining module 601, a segmentation mask obtaining module 602, a first position relationship feature obtaining module 603, a second position relationship feature obtaining module 604, and a pose information obtaining module 605.

The first target image obtaining module 601 is configured to obtain a target image including a target object.

The segmentation mask obtaining module 602 is configured to perform instance segmentation on the target image to obtain a segmentation mask corresponding to the target object.

The first position relationship feature obtaining module 603 is configured to obtain, based on the segmentation mask, position relationship features between target pixels in a target region in which the target object is located in the target image.

The second position relationship feature obtaining module 604 is configured to obtain position relationship features between standard pixels in a preset region of interest in a standard image, where the standard image includes a standard object corresponding to the target object.

The pose information obtaining module 605 is configured to match the position relationship features between the target pixels and the position relationship features between the standard pixels, to obtain a correspondence between the target pixels and the standard pixels, and obtain pose information of the target object based on the correspondence.

In some embodiments, the first position relationship feature obtaining module 602 is further configured to combine, based on the segmentation mask, the target pixels in the target region in which the target object is located in the target image in pairs, to obtain a plurality of target pixel pairs, and obtain, for each target pixel pair, a position relationship feature between two target pixels in the target pixel pair.

The second position relationship feature obtaining module 603 is further configured to obtain the standard image and the preset region of interest in the standard image; and combine the standard pixels in the preset region of interest in the standard image in pairs, to obtain a plurality of standard pixel pairs, and obtain, for each standard pixel pair, a position relationship feature between two standard pixels in the standard pixel pair.

In some embodiments, for each target pixel pair, the position relationship feature between the two target pixels in the target pixel pair is obtained based on a distance between the two target pixels, an angle between normal vectors corresponding to the two target pixels respectively, and angles between the normal vectors corresponding to the two target pixels and a connection line between the two target pixels; and for each standard pixel pair, the position relationship feature between the two standard pixels in the standard pixel pair is obtained based on a distance between the two standard pixels, an angle between normal vectors corresponding to the two standard pixels respectively, and angles between the normal vectors corresponding to the two standard pixels and a connection line between the two standard pixels.

In some embodiments, the segmentation mask obtaining module 602 is further configured to input the target image into a pre-trained instance segmentation model, and perform instance segmentation on the target image by using the instance segmentation model, to obtain the segmentation mask corresponding to the target object.

In some embodiments, the instance segmentation model includes a feature extraction network, a feature fusion network, a feature alignment layer, a classification and regression network, and a segmentation mask network; and the segmentation mask obtaining module 602 is further configured to: input the target image into the feature extraction network in the pre-trained instance segmentation model, and perform multi-scale feature extraction on the target image by using the feature extraction network, to obtain a plurality of levels of initial feature maps corresponding to the target image; perform feature fusion on the plurality of levels of initial feature maps by using the feature fusion network, to obtain fused feature maps; obtain information about an initial region of the target object based on the fused feature map and by using the region generation network; perform feature extraction on the initial feature maps based on the information about the initial region and by using the feature alignment layer, to obtain a region feature map corresponding to the initial region and in the initial feature maps; obtain category information and position information of the target object based on the region feature map and by using the classification and regression network; and obtain the segmentation mask corresponding to the target object based on the region feature map and by using the segmentation mask network.

In some embodiments, when performing feature fusion on the plurality of levels of initial feature maps by using the feature fusion network, to obtain fused feature maps, the segmentation mask obtaining module 602 is further configured to: perform a convolution operation on each of the initial feature maps by using the feature fusion network, to obtain a plurality of levels of initial dimension-reduced feature maps; sequentially perform fusion processing on every two adjacent levels of initial dimension-reduced feature maps according to a descending order of levels, to obtain an initially fused feature map, and update an initial dimension-reduced feature map at a lower level in the adjacent levels by using the initially fused feature map, where a size of an initial dimension-reduced feature map at an upper level is less than a size of the initial dimension-reduced feature map at the lower level; perform the convolution operation on each of the initially fused feature maps, to obtain a plurality of levels of dimension-reduced feature maps; and sequentially perform fusion processing on every two adjacent levels of dimension-reduced feature maps according to an ascending order of levels, to obtain a transition feature map, perform fusion processing on the transition feature map and the initial feature map, to obtain a fused feature map, and update a dimension-reduced feature map at an upper level in the adjacent levels by using the fused feature map, where a size of the dimension-reduced feature map at the upper level is less than a size of a dimension-reduced feature map at a lower level.

In some embodiments, the feature extraction network includes two concatenated convolution layers, a size of a convolution kernel the former convolution layer is 1*1, and a convolution stride of the former convolution layer is 1; and a convolution stride of the latter convolution layer is less than or equal to a size of a convolution kernel of the latter convolution layer.

The target detection apparatus in this embodiment of this application is configured to implement one or more of the target detection methods described herein and has the beneficial effects of the corresponding method embodiments. Details are not described herein again. In addition, for a function implementation of each module in the target detection apparatus in this embodiment of this application, reference may be made to a description of a corresponding part in the method embodiments. Details are not described herein again.

Based on the target detection method according to any of the embodiments, an electronic device may include: a processor, a memory, a communication interface, and a communication bus, where the processor, the memory, and the communication interface complete mutual communication by using the communication bus; and the memory is configured to store at least one executable instruction, and the executable instruction causes the processor to perform one or more of the target detection methods described herein.

Based on the target detection method according to any of the embodiments, a computer storage medium may store a computer program, where the computer program, when being executed by a processor, implements one or more of the methods described herein.

It should be noted that according to the needs of implementation, each component/step described in this disclosure can be split into more components/steps, or two or more components/steps or some operations of components/steps can be combined into new components/steps, to achieve the purpose of the embodiments of this application.

The method according to the embodiments of this application can be implemented in hardware and firmware, or implemented as software or computer code that can be stored in a recording medium (for example, a CD ROM, a RAM, a floppy disk, a hard disk, or a magneto-optical disk), or implemented by computer code downloaded from a network and stored in a remote recording medium or a non-transitory machine-readable medium and stored in a local recording medium. Therefore, the method described herein can be processed by such software stored on a recording medium using a general-purpose computer, a dedicated processor, or programmable or dedicated hardware (for example, ASIC or FPGA). It can be understood that a computer, processor, a microprocessor controller, or programmable hardware includes a storage component (for example, a RAM, a ROM, or a flash memory) that can store or receive software or computer code. When the software or the computer code is accessed and executed by the computer, the processor, or the hardware, the target detection method described herein is implemented. In addition, when the general-purpose computer accesses code for implementing the target detection method shown herein, the execution of the code converts the general-purpose computer into the dedicated computer for executing the target detection method shown herein.

It should be further noted that the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Without further limitation, the element defined by a phrase "include one . . . " does not exclude other same elements in the process, method, article or device which include the element.

A person of ordinary skill in the art may notice that the exemplary units and method steps described with reference to the embodiments disclosed in this specification can be implemented in electronic hardware, or a combination of computer software and electronic hardware. Whether these functions are executed in the manner of hardware or software depends on specific applications and design constraints of the technical solutions. A person skilled in the art may use different methods to implement the described functions for each particular application, but it should not be considered that the implementation goes beyond the scope of the embodiments of this application.

The embodiments of this specification are all described in a progressive manner, for same or similar parts in the embodiments, refer to such embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing implementations are only used to describe the embodiments of this application, and are not intended to limit the embodiments of this application. A person of ordinary skill in the art can make various changes and modifications without departing from the spirit and scope of the embodiments of this application. Therefore, all equivalent technical solutions also belong to the scope of the embodiments of this application, and the scope of patent protection of the embodiments of this application should be defined by the claims.

What is claimed is:

1. A target detection method comprising:

obtaining a target image representing a target object;

performing instance segmentation on the target image to obtain a segmentation mask corresponding to the target object;

obtaining first position relationship features based on characteristics of target pixels in a target region in which the target object is located in the target image using the segmentation mask;

obtaining second position relationship features based on characteristics of standard pixels in a preset region of interest of a standard object in a standard image;

matching the first position relationship features of the target pixels to the second position relationship features of the standard pixels to obtain a correspondence between the target pixels and the standard pixels;

obtaining pose information of the target object based on the correspondence;

inputting the target image into a pre-trained instance segmentation model; and performing instance segmentation on the target image by using the pre-trained instance segmentation model to obtain the segmentation mask corresponding to the target object;

wherein the pre-trained instance segmentation model comprises: a feature extraction network, a feature fusion network, a region generation network, a feature alignment layer, a classification and regression network, and a segmentation mask network;

wherein performing instance segmentation on the target image by using the pre-trained instance segmentation model comprises:

putting the target image into the feature extraction network in the pre-trained instance segmentation model, and performing multi-scale feature extraction on the target image by using the feature extraction network, to obtain a plurality of levels of initial feature maps corresponding to the target image;

performing feature fusion on the plurality of levels of initial feature maps using the feature fusion network to obtain fused feature maps;

obtaining information about an initial region of the target object based on a resulting fused feature map and using the region generation network;

performing feature extraction on the plurality of levels of initial feature maps based on the information about the initial region and using the feature alignment layer, to obtain a region feature map corresponding to the initial region in the plurality of levels of initial feature maps;

obtaining category information and position information of the target object based on the region feature map and using the classification and regression network; and obtaining the segmentation mask corresponding to the target object based on the region feature map and using the segmentation mask network; and wherein performing feature fusion on the plurality of levels of initial feature maps using the feature fusion network to obtain the fused feature maps comprises:

performing a convolution operation on each of the plurality of levels of initial feature maps by using the feature fusion network to obtain a plurality of levels of initial dimension-reduced feature maps;

sequentially performing fusion processing on every two adjacent levels of the plurality of levels of initial dimension-reduced feature maps according to a descending order of levels, to obtain a plurality of initially fused feature maps, and updating an initial dimension-reduced feature map at a lower level in the adjacent levels by using a corresponding initially fused feature map of the plurality of initially fused feature maps, wherein a size of an initial dimension-reduced feature map at an upper level is less than a size of the initial dimension-reduced feature map at the lower level;

performing the convolution operation on each of the plurality of initially fused feature maps, to obtain a plurality of levels of dimension-reduced feature maps; and sequentially performing fusion processing on every two adjacent levels of the plurality of levels of dimension-reduced feature maps according to an ascending order of levels, to obtain a transition feature map, performing fusion processing on the transition feature map and a corresponding initial feature map from the plurality of levels of initial feature maps, to obtain a fused feature map, and updating a dimension-reduced feature map at an upper level in the adjacent levels using the fused feature map, wherein a size of the dimension-reduced feature map at the upper level is less than a size of a dimension-reduced feature map at a lower level.

2. The method according to claim 1, wherein:

obtaining the first position relationship features of the target pixels comprises combining, based on the segmentation mask, the target pixels in the target region in which the target object is located in the target image in pairs, to obtain a plurality of target pixel pairs, and obtaining, for each target pixel pair of the plurality of target pixel pairs, a position relationship feature between two target pixels in the target pixel pair; and obtaining the second position relationship features of the standard pixels in the preset region of interest of the standard object in the standard image comprises obtaining the standard image and the preset region of interest of the standard object in the standard image; and the method further comprises combining the standard pixels in the preset region of interest in pairs, to obtain a plurality of standard pixel pairs, and obtaining, for each standard pixel pair of the plurality of standard pixel pairs, a position relationship feature between two standard pixels in the standard pixel pair.

3. The method according to claim 2, wherein:

for each target pixel pair of the plurality of target pixel pairs, the position relationship feature between the two target pixels in the target pixel pair is obtained based on a distance between the two target pixels, an angle between normal vectors corresponding to the two target pixels respectively, and angles between the normal vectors corresponding to the two target pixels and a connection line between the two target pixels; and for each standard pixel pair of the plurality of standard pixel pairs, the position relationship feature between the two standard pixels in the standard pixel pair is obtained based on a distance between the two standard pixels, an angle between normal vectors corresponding to the two standard pixels respectively, and angles between the normal vectors corresponding to the two standard pixels and a connection line between the two standard pixels.

4. The method according to claim 1, wherein:

the feature extraction network comprises two concatenated convolution layers;

a size of a convolution kernel of a first of the two concatenated convolution layers is 1*1;

a convolution stride of the first convolution layer is 1; and a convolution stride of a second of the two concatenated convolution layers is less than or equal to a size of a convolution kernel of the second convolution layer.

5. An electronic device comprising:

a processor;

a memory;

a communication interface; and a communication bus providing mutual communication between the processor, the memory, and the communication interface;

wherein the memory is configured to store at least one executable instruction, and the at least one executable instruction causes the processor to:

obtain a target image comprising a target object;

perform instance segmentation on the target image to obtain a segmentation mask corresponding to the target object;

obtain position relationship features based on characteristics of target pixels in a target region in which the target object is located in the target image using the segmentation mask;

obtain position relationship features based on characteristics of standard pixels in a preset region of interest of a standard object in a standard image;

match the position relationship features of the target pixels to the position relationship features of the standard pixels to obtain a correspondence between the target pixels and the standard pixels;

obtain pose information of the target object based on the correspondence;

put the target image into a pre-trained instance segmentation model; and perform instance segmentation on the target image by using the pre-trained instance segmentation model to obtain the segmentation mask corresponding to the target object;

wherein the pre-trained instance segmentation model comprises: a feature extraction network, a feature fusion network, a region generation network, a feature alignment layer, a classification and regression network, and a segmentation mask network;

wherein performing instance segmentation on the target image by using the pre-trained instance segmentation model comprises:

putting the target image into the feature extraction network in the pre-trained instance segmentation model, and performing multi-scale feature extraction on the target image by using the feature extraction network, to obtain a plurality of levels of initial feature maps corresponding to the target image;

performing feature fusion on the plurality of levels of initial feature maps using the feature fusion network to obtain fused feature maps;

obtaining information about an initial region of the target object based on a resulting fused feature map and using the region generation network;

performing feature extraction on the plurality of levels of initial feature maps based on the information about the initial region and using the feature alignment layer, to obtain a region feature map corresponding to the initial region in the plurality of levels of initial feature maps;

obtaining category information and position information of the target object based on the region feature map and using the classification and regression network; and obtaining the segmentation mask corresponding to the target object based on the region feature map and using the segmentation mask network; and wherein performing feature fusion on the plurality of levels of initial feature maps using the feature fusion network to obtain the fused feature maps comprises:

performing a convolution operation on each of the plurality of levels of initial feature maps by using the feature fusion network to obtain a plurality of levels of initial dimension-reduced feature maps:

sequentially performing fusion processing on every two adjacent levels of the plurality of levels of initial dimension-reduced feature maps according to a descending order of levels, to obtain a plurality of initially fused feature maps, and updating an initial dimension-reduced feature map at a lower level in the adjacent levels by using a corresponding initially fused feature map of the plurality of initially fused feature maps, wherein a size of an initial dimension-reduced feature map at an upper level is less than a size of the initial dimension-reduced feature map at the lower level;

performing the convolution operation on each of the plurality of initially fused feature maps, to obtain a plurality of levels of dimension-reduced feature maps; and sequentially performing fusion processing on every two adjacent levels of the plurality of levels of dimension-reduced feature maps according to an ascending order of levels, to obtain a transition feature map, performing fusion processing on the transition feature map and a corresponding initial feature map from the plurality of levels of initial feature maps, to obtain a fused feature map, and updating a dimension-reduced feature map at an upper level in the adjacent levels using the fused feature map, wherein a size of the dimension-reduced feature map at the upper level is less than a size of a dimension-reduced feature map at a lower level.

\* \* \* \* \*